June 19, 1962 L. H. DIXON, JR 3,039,175

SEALING OF ELECTRICAL SEMICONDUCTOR DEVICES

Original Filed Nov. 9, 1959

INVENTOR.

LLOYD H. DIXON, JR.

BY

Dike, Thompson & Bronstein

ATTORNEYS 3,039,175
Patented June 19, 1962

1

3,039,175

SEALING OF ELECTRICAL SEMICONDUCTOR DEVICES

Lloyd H. Dixon, Jr., Billerica, Mass., assignor to Solid State Products Inc., Salem, Mass., a corporation of Massachusetts Original application Nov. 9, 1959, Ser. No. 851,751, now Patent No. 3,020,454, dated Feb. 6, 1962. Divided and this application Dec. 6, 1960, Ser. No. 74,121
7 Claims. (Cl. 29—25.3)

The present invention relates to the sealing of electrical semiconductor devices and, in one particular aspect, to the improved protective enclosure of transistors uniquely resolving incompatibilities between pressure-weldable material and vitreous insulating hermetic seals for electrical connections.

This application is a division of my copending application Serial No. 851,751, filed November 9, 1959, for "Sealing of Electrical Semiconductor Devices," now Patent No. 3,020,454 issued February 6, 1962.

As is currently well understood in the art, the advantages to be realized from protectively enclosing and hermetically sealing solid-state devices such as transistors, broad-area current rectifiers and diodes, are of such importance as to make these practices virtually mandatory in the manufacture of commercial grades of these devices. In addition to the more obvious benefits of safeguarding the enclosed delicate contacts and semiconductor elements against physical disturbances from outside, and of providing an integrated component which can be handled conveniently, there is the further advantage that the sensitive semiconductor materials are isolated from environmental contaminants which even in minute quantities can in time impair their electrical operating characteristics.

The latter consideration dictates hermetic sealing, and commonly a metallic enclosure is selected for such reasons as its inherent imperviousness, desirable electrical and thermal qualities, and ready adaptability to production using conventional machinery and techniques. Electrical requirements necessitate insulated lead-through provisions which preserve the sealing, and manufacturing practices prescribe that certain of the enclosure-sealing operations occur only after the sensitive semiconductor and its contacts have been fixed in place. Known enclosure-sealing techniques have involved brazing, soldering and welding, particularly projection-welding which is a form of resistance welding, in all of which intense heat is developed. Contaminating atmospheres are often created inside the enclosure as a result of these methods of sealing. Semiconductor elements and their connections are notoriously susceptible to ill effects at high temperatures, as are also certain preliminary seals such as those which employ low-melting point solders, and design efforts have therefore sought to diminish the required heating times and to confine the thermal shocks to relatively isolated locations as distant as possible from the sites which are sensitive. Resulting designs thus tend to be larger than would otherwise be necessary, and, in the case of projection-welded units, one part of the sub-assembly is normally provided with a precision-made knife-edge projection which can become fully welded to an abutting surface without flaws. Risk of inoperativeness and faulty performance from thermal shocks and undesired contaminants remains high in the units sealed in this manner.

According to the present teachings, the sealing of metal-enclosed semiconductor devices is achieved without the usual high-temperature bond and yet with the full and important advantages of firm intermolecular bonding. In part, this is made possible by cold pressure-welded junctions, which involve only low temperatures, avoid injurious shocks of both mechanical and thermal origins, and unify the metal parts of subassemblies into rugged

2 and impervious enclosures. Cold welding has been known as a technique for joining materials, of course, but one is deterred from use of such junctions in the fabrication of hermetically sealed electrical devices because of the sealing incompatability between preferred pressure-weldable metals and the vitreous insulating materials which are employed to carry electrical leads through the enclosures. The most practical of these metals, such as plentiful and inexpensive copper and aluminum and their alloys, are malleable enough for efficient cold welding purposes and yet impart adequate structural strength to the parts into which they are made. Unfortunately, however, these metals are not readily united and preserved in sealed relationship with such insulating materials as the known glasses and ceramics used as lead-through insulators. Rather, for hermetic sealing purposes, these vitreous materials are best adapted for juncture with special hard alloys such as Kovar and known steels which are not well adapted to pressure welding.

Therefore, it is an object of the present invention to provide a novel and improved method for enclosing solid-state electrical devices which avoids thermal shocks and produces efficient and lasting hermetic seals.

By way of a summary account of practice of this invention in one of its aspects, an enclosed transistor unit is fabricated using base and cover subassemblies which are adapted to be joined together in a pressure-welded hermetically sealed relationship about a cavity in which are disposed a semiconductor wafer and its electrical contacts. The cover portion comprises a miniature drawn copper cylindrical cup having a narrow outwardly-projecting annular flange integral with it about the open end; the base subassembly is similarly cup-shaped and also includes a narrow outwardly-projecting annular copper flange about its open end, such that the two flanges may abut when the open ends of the cover and base confront one another. The base subassembly is not entirely of copper, however, and includes a small steel disk molecularly bonded with the bottom exterior surface of the base. In manufacture, the base subassembly is formed by punching a circular disk from a strip of copper-clad steel, such as has been available commercially, and thereafter coining the copper-clad disk to thin out only the copper layer and draw the copper into a flanged cup upstanding from and integral with the steel disk. Holes are pierced through the copper-clad disk, and glass-beaded conductors are sealed with it to form either a known compression or matched hermetic seal between the glass and steel. The thinned layer of copper remaining upon the steel disk is of sufficient thickness to serve as an efficient medium for dissipation of heat from the semiconductor wafer, and to this end, the wafer is mounted upon the copper layer by way of a high-alumina ceramic member which is an electrical insulator and yet an efficient thermal conductor. Electrical connections promoting emitter, collector and base electrode functions are made through the glass-insulated conductors, and the flanges of the subassemblies are brought into confronting relationship. High pressures are applied only upon the outsides of the flanges to squeeze and flow the copper together and thereby form a molecular fusion and tight hermetic sealing of the flanges at a low temperature.

Although the features of this invention which are believed to be novel are set forth in the appended claims, greater detail as to the practice of the invention in connection with preferred embodiments, as well as the further objects and advantages thereof, may be readily comprehended through reference to the following description taken in connection with the accompanying drawings, wherein:

Figure 1:
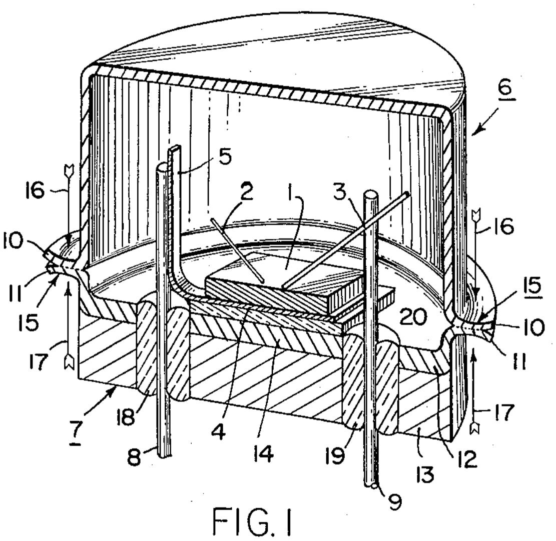
FIGURE 1 is a cross-sectional pictorial view of a sealed transistor unit constructed in accordance with the present teachings.

The embodiment of a preferred hermetically sealed transistor unit which is depicted in vast enlargement in FIGURE 1 includes a conventional form of diced semiconductor wafer 1 together with its associated emitter and base contacts 2 and 3 and a collector contact 4 from which extends a ribbon connector 5. Two small cup-shaped metallic housing parts, 6 and 7, are joined together in enclosing relationship to the wafer and its contacts, there being in addition, three insulated lead-through terminals such as sealed beaded terminals 8 and 9 which project outside the unit for circuit-coupling purposes and which are electrically and mechanically connected with the transistor contacts within the enclosure. Outer ends of the three terminals may serve either as pin connectors for a socket mounting of the unit or as leads which may be soldered to other circuit components or a printed circuit board in known manner.

Each of the two housing parts 6 and 7 is of generally cylindrical configuration, and each is provided with an integral narrow annular flange, 10 and 11 respectively, extending outwardly in a substantially radial direction about the end confronting the opposite part. The metal constituting these flanges possesses those characteristics, such as good malleability and softness, which are needed for cold working into permanent pressure-welded junctions. Preferably, such metal comprises copper or aluminum of the highest possible purity, such as the known OFHC copper which is an oxygen-free high-conductivity copper. Alloys having like qualities may be used where the added material does not so harden the metal as to make it unsuitable for pressure welding. These metals also possess excellent thermal conductivity characteristics, which would constitute a handicap in structures in which sealing by high temperature welding, brazing or soldering would tend to deteriorate the semiconductor device, but which are instead advantageously exploited for heat-dissipation purposes during operation without introducing risk of transistor damage during fabrication of the improved sealed unit. The cap 6 is conveniently a simple drawn part, formed from a single copper blank in cup-drawing operations. Base 7, on the other hand, includes two integral portions of dissimilar metals, one of which is a coined cup-shaped portion 12 of the same pressure-weldable metal as the cap, copper in this instance, and the other of which is a steel disk 13 having its top surface permanently bonded with the lower surface of the base 14 of the flanged cup-shaped portion 12. The copper of both narrow flanges 10 and 11 is flowed together at the narrow annular site 15 by pressures applied to the outsides of these abutting flanges in the opposing directions of arrows 16 and 17. Copper from the two flanges remains united through molecular bonding, such that there is no boundary between the blended flanges at site 15, and strong, permanent and impervious sealing is realized between the cap an base. The further hermetic seals of the enclosed unit are those existing between the lead-through terminals and the disk portions 13 by way of vitreous insulating material. Terminals 8 and 9 are shown to have known glass "beads" 18 and 19, respectively, sealed about them, for example, and these beads are in turn disposed within accommodating openings through both the disk portion 13 and its copper cladding 14. The glasses and ceramics used for these insulating and sealing purposes are not compatible with the pressure-weldable material in that they cannot readily be bonded tightly with such material, such that the copper cladding 14 remains unsealed in relation to beads 18 and 19, while the advantageous conventional "compression" or "matched" sealing techniques insure that the steel of disk 13 is instead tightly sealed with the vitreous insulating elements. In accordance with compression sealing practices, the glass bead elements are fused with the surrounding steel disk of the base in a furnace at high temperature before the transistor is assembled upon the base. As the temperature is reduced, the different thermal coefficients of expansion of the disk and glass result in a desired compression and positive sealing of the bead. Matched sealing is achieved in a similar manner, except that the disk includes a special alloy, such as Kovar, which possesses a thermal coefficient matched with that of the vitreous insulation material. In both instances, the copper cladding 14 fails to produce a firm and permanent bond with the insulation, although this is of course rendered unnecessary because of the bonding of the copper to the steel and, in turn, the steel to the lead-through insulation. While the terminals may be provided with separate small insulating elements disposed in separate base openings, as illustrated, a group of such terminals may alternatively be spaced and supported in one larger vitreous insulating element mounted in a single larger base opening.

Copper and aluminum offer high thermal conductivities which, in the preferred constructions promote rapid heat dissipations. In this connection, it is to be noted that such material extends not only over the large areas of the cap, the sealed flanges, and part of the side walls of the base, but also fully across the top of the steel disk, except for the areas of the lead-through openings. The latter expanse, 14, provides a surface of good electrical and thermal conductivity upon which a semiconductor wafer may be mounted with the advantage of improved heat dissipation, whereby susceptibility to thermally-induced damage is lessened. This advantage can be developed without risk of destructive thermal shocking during manufacture because the pressure welding of the flanges involves no application of intense heat such as is required in the fabrication of other sealed units. However, this advantage is largely forfeited when the semiconductor element is insulated from its housing, as is commonly the requirement to prevent its potentials from appearing on the housing. For this reason, the transistor wafer 1 and its collector 4 are mounted upon the copper cladding 14 by way of a special thin ceramic wafer 20 which is electrically insulating but which possesses high thermal conductivity nevertheless. Metallized surfaces on the ceramic permit its soldering to the transistor wafer and to the enclosure. Ceramic material suitable for this application includes a high content of beryllia (BeO), upwardly of 50%, or alumina ($Al_2O_3$), upwardly of 85%, along with the usual clay and fillers. The entire housing, and particularly the copper areas thereof, serves as a medium for quickly releasing potentially troublesome heat developed by the transistor, while being fully isolated from it electrically.

Steels used for the disk 13 possess a high dimensional stability needed to preserve good compression seals with the vitreous insulation. Iron alloys, such as Kovar and Invar, are used where matched seals are produced, the added metals such as nickel and cobalt serving to develop desired temperature coefficients.

Figure 2:
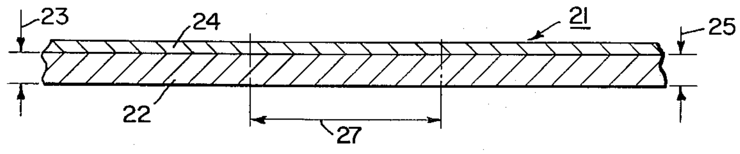
FIGURE 2 illustrates a cross-sectioned steel strip clad with pressure-weldable material for an operation in the improved manufacture of a semiconductor enclosure.
Figure 3:
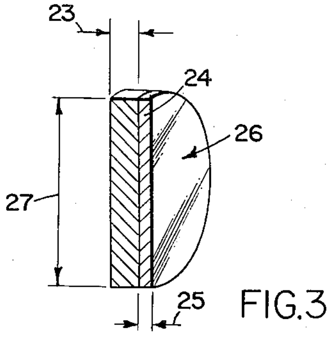
FIGURE 3 is a cross-section of a disk clad with pressure-weldable material used in the improved manufacture of an enclosure.
Figure 4:
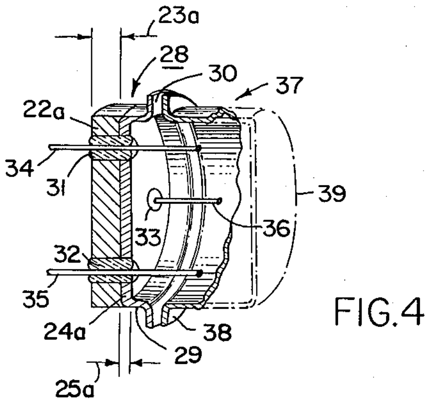
FIGURE 4 depicts a cross-sectional enclosure assembly carrying sealed lead-through conductors and disposed for pressure welding with a complementary enclosure member, part of which is broken away and outlined in dashed linework.

In the manufacture of such devices, the assembly including the two dissimilar pressure-weldable and glass-sealing metals is conveniently prepared using a commercially available sheet or strip of laminated stock, 21 (FIGURE 2). Taking copper-clad steel as the example, the strip 21 is selected to have a steel lamination 22 of minimum thickness 23 dictated by the needs of the later hermetic sealing with glass lead-through insulators. The copper cladding 24 integral with the steel is of a thickness 25 in excess of that which is to remain as cladding for the steel disk in the finished product. From this strip small disks 26 (FIGURE 3) of a desired diameter 27 are cut, preferably in a simple punching operation. Subsequently, the copper-clad steel disks 26 may be annealed, to soften the copper 24 which may have become work-hardened earlier. Next, the disk 26 is placed in the recess of a coining die, preferably with the steel side lowermost, and subjected to intense pressures applied by a male die member, whereupon substantially the soft copper alone is extruded to form copper cylindrical side walls normal to the steel layer and its thinned-out copper cladding. The assembly 28 in FIGURE 4, which is to the same scale as the elements in FIGURE 3, displays features of the coined disk, the steel layer 22*a* then being of a thickness 23*a* which is substantially unaltered, while the copper layer 24*a* is reduced from the former thickness 25 to a lesser thickness 25*a* which evidences the loss of copper extruded into the cylindrical side walls 29 and narrow annular flange 30. Flange 30 may be created simultaneously, or in a further forming step, and is then preferably trimmed to the desired circularity and narrowness in a trimming die. Thereafter, the desired openings for lead-through insulators 31, 32 and 33 and their associated leads 34, 35 and 36, respectively, are formed with care to insure that the copper does not line the openings through the steel and thereby prevent a proper glass-to-steel seal from being realized in subsequent processing. This difficulty may be avoided by progressing from the steel to the copper side in making the openings; in the highly miniaturized units these openings are pierced through from the steel side. After a cleaning to remove oils, the leads and glass seals are installed and fused with the steel in a furnace to produce the needed hermetic sealing, in accordance with the compression or matched sealing practices, for example. In those instance where a semiconductor element is to be mounted upon the copper layer, in the manner of the structure of FIGURE 1, the later acid etching of such elements requires that the entire assembly 28 be protectively gold plated, and this step follows a first plating with nickel which affords a buffer between the copper and gold. Acid etching is then performed in the customary manner, where required.

A cooperating housing part 37 of comparable generally cylindrical proportions and cup shaped configuration is formed, from a copper blank, preferably in a drawing operation, and is also provided with a narrow annular flange 38 which may be created simultaneously with or following the drawing and which is trimmed in a suitable die. The closed end 39 of this housing part is broken away and outlined in dashed linework to indicate that the configurations may be varied to aid in cooling or in the mounting of the enclosed electrical device upon it rather than directly upon assembly 28. Clean flanges 30 and 38 are brought into abutting relationship and pressed together until the copper from both flanges merges and unites molecularly in tightly sealed relationship, thereby hermetically sealing the enclosed electrical device. A pair of oppositely-disposed hollow cylindrical members which surround parts 28 and 37 and transmit the required pressures to the flanges may be used to develop the cold annular pressure weld while leaving the remainder of the unit substantially unstressed. Although it may be helpful to remove any plating material, such as the aforesaid nickel and gold plating, from the flanges before they are pressure-welded, the spread and flow of the copper in the flanges during the cold welding is found to break down the plating and permit the desired uniting of the flanges nevertheless.

The preferred embodiments and practices portrayed and described herein have been presented by way of illustration rather than limitation, and those skilled in the art will recognize that various changes and modifications may be accomplished without departing either in spirit or scope from this invention as set forth in the appended claims.

What I claim as new and desire to secure by Letters Patent of the United States is:

1. The method of manufacturing sealed electrical semiconductor apparatus which comprises cutting out a disk-like member from laminated stock including a base layer of metal containing iron clad with a layer of pressure-weldable metal to form an enclosure structure having a disk-like base of said metal containing iron and an integral coating of said pressure-weldable metal which extends along the peripheral part of said structure, forming an opening through said disk-like base, mounting an electrical lead in said opening in spaced relationship to said layers, sealing a vitreous electrical insulation material with said lead and with said base layer of metal containing iron in said opening at high temperature to close and seal said opening, drawing a cup-shaped enclosure member of said pressure-weldable metal and forming an integral peripheral part extending outwardly about the open end thereof, connecting said lead with a contact of a semiconductor device, enclosing said semiconductor device within said cup-shaped member and said enclosure structure with the pressure-weldable metal of said parts in abutting relationship, and applying directly to said parts pressures uniting said pressure-weldable metal thereof.

2. The method of manufacturing sealed electrical semiconductor apparatus which comprises the steps of punching out a small part from flat laminated stock including a base layer of metal containing iron clad with a layer of pressure-weldable metal, applying pressure to and reducing the thickness of said layer of pressure-weldable metal to form a peripheral flange of said pressure-weldable metal integral with and extending outwardly beyond said base layer, forming an opening through said base layer and layer of pressure-weldable metal, mounting an electrical lead in said opening in spaced relationship to said layers, bonding a vitreous electrical insulation material with said lead and said base layer in said opening at high temperature to close and seal said opening, cooling said part with said lead mounted therein, forming a cup-shaped enclosure having a peripheral flange of said pressure-weldable metal about the open end thereof, connecting said lead with a contact of a semiconductor device, enclosing said semiconductor device within said cup-shaped member and said flanged part with said flanges in abutting relationship, and applying directly to said flanges pressures uniting said pressure-weldable metal thereof.

3. The method of manufacturing sealed electrical semiconductor apparatus which comprises the steps of punching out a disk from laminated stock including a base layer of metal containing iron clad with a layer of pressure-weldable metal, applying pressure to and reducing the thickness of said layer of pressure-weldable metal on said disk to form a cylindrical wall of said pressure-weldable metal terminating in an annular flange of said pressure-weldable metal around the outside of the open end of said wall, forming an opening through said disk progressively from said base layer through said layer of pressure-weldable metal, mounting an electrical lead in said opening in spaced relationship to said layers, bonding a vitreous electrical insulation material with said lead and said base layer of said disk in said opening at high temperature to close and seal said opening, cooling said disk with said lead mounted therein, forming a cup-shaped enclosure member of said pressure-weldable metal having an integral annular flange about the outside of the open end thereof, connecting said lead with a contact of said semiconductor device, enclosing said semiconductor device within said cup-shaped member and walled disk with said flanges in abutting relationship, and applying directly to said flanges pressure uniting said pressure-weldable metal thereof.

4. The method according to claim 3 wherein said punching step is followed by the step of annealing said disk to soften the work-hardening of said pressure-weldable metal, and wherein said step of forming said opening comprises piercing said disk from said base layer toward and through said layer of pressure-weldable metal, whereby said metal of said base layer remains uncoated by said pressure-weldable metal in said opening.

5. The method of manufacturing sealed electrical semiconductor apparatus which comprises the steps of punching out a disk from laminated stock including a steel base layer clad with copper, applying pressure to and reducing the thickness of said copper layer to form a copper cup upstanding from said steel base layer and having an annular copper flange about the outside of the open end thereof, forming an opening through said steel base layer progressively from said base layer through said copper layer, mounting an electrical lead in said opening in spaced relationship to said layers, bonding glass insulation with said lead and said steel base layer in said opening at high temperature to close and seal said opening, cooling said disk, drawing a cup-shaped copper enclosure member having an integral annular flange about the outside of the open end thereof, connecting said lead with a contact of said semiconductor device, enclosing said semiconductor device within said cup-shaped member and cup with said flanges in abutting relationship, and applying directly to said flanges pressure uniting said pressure-weldable metal thereof.

6. The method of manufacturing sealing structure for the hermetic sealing of semiconductor devices which comprises the steps of punching out a small part from flat laminated stock including a base layer of metal containing iron clad with a layer of pressure-weldable metal, applying pressure to and reducing the thickness of said layer of pressure-weldable metal to form a peripheral flange of said pressure-weldable metal integral with and extending outwardly beyond said base layer, forming an opening through said base layer progressively from said base layer through said layer of pressure-weldable metal, mounting an electrical lead in said opening in spaced relationship to said layers, and bonding a vitreous electrical insulation material with said lead and said base layer of said disk in said opening at high temperature to close and seal said opening.

7. The method of manufacturing sealing structure for the hermetic sealing of semiconductor devices which comprises the steps of punching out a disk from laminated stock including a steel layer clad with copper, applying pressure to and reducing the thickness of said copper layer to form a copper cup upstanding from said steel base and having an annular copper flange about the outside of the open end thereof, piercing an opening through said steel base layer and copper layer progressively from said base through said copper layer, mounting an electrical lead in said opening in spaced relationship to said layers and bonding glass insulation with said lead and said steel base layer in said opening at high temperature to close and seal said opening.

References Cited in the file of this patent

UNITED STATES PATENTS 2,810,873 Knott ---------------- Oct. 22, 1957

2,976,465 Jensen ---------------- Mar. 21, 1961